(12) United States Patent
Aulin et al.

(10) Patent No.: US 10,138,599 B2
(45) Date of Patent: Nov. 27, 2018

(54) PROCESS FOR THE PRODUCTION OF A COATED SUBSTANCE COMPRISING CELLULOSIC FIBRES

(71) Applicant: STORA ENSO OYJ, Helsinki (FI)

(72) Inventors: Christian Aulin, Stockholm (SE); Lars Axrup, Hammarö (SE); Göran Flodberg, Lindingö (SE); Magnus Hillergren, Solna (SE); Tom Lindström, Sollentuna (SE); Carl-Henrik Ljungqvist, Karlstad (SE); Göran Ström, Stockholm (SE)

(73) Assignee: STORA ENSO OYJ, Helsinki (FI)

( * ) Notice: Subject to any disclaimer, the term of this patent is extended or adjusted under 35 U.S.C. 154(b) by 0 days.

(21) Appl. No.: 15/535,456

(22) PCT Filed: Dec. 14, 2015

(86) PCT No.: PCT/IB2015/059579
§ 371 (c)(1),
(2) Date: Jun. 13, 2017

(87) PCT Pub. No.: WO2016/097964
PCT Pub. Date: Jun. 23, 2016

(65) Prior Publication Data
US 2017/0342661 A1    Nov. 30, 2017

(30) Foreign Application Priority Data

Dec. 18, 2014 (SE) ........................... 1451581

(51) Int. Cl.
| | | |
|---|---|---|
| *D21H 19/34* | (2006.01) | |
| *D21H 23/50* | (2006.01) | |
| *D21H 23/70* | (2006.01) | |
| *D21H 27/10* | (2006.01) | |
| *D21H 27/32* | (2006.01) | |
| *D21H 11/18* | (2006.01) | |
| *B32B 37/15* | (2006.01) | |
| *B32B 37/24* | (2006.01) | |

(52) U.S. Cl.
CPC ............ *D21H 19/34* (2013.01); *D21H 11/18* (2013.01); *D21H 23/50* (2013.01); *D21H 23/70* (2013.01); *D21H 27/10* (2013.01); *D21H 27/32* (2013.01); *B32B 37/153* (2013.01); *B32B 2037/243* (2013.01); *B32B 2317/12* (2013.01)

(58) Field of Classification Search
CPC ........ D21H 19/34; D21H 11/18; D21H 23/50; D21H 23/70; D21H 27/10; D21H 27/32; B32B 37/153; B32B 2037/243; B32B 2317/12
USPC ........................................................ 428/535
See application file for complete search history.

(56) References Cited

U.S. PATENT DOCUMENTS

| | | | | |
|---|---|---|---|---|
| 9,175,441 B2* | 11/2015 | Heiskanen | ............. | D21H 19/34 |
| 2012/0219816 A1* | 8/2012 | Heiskanen | ............. | D21H 19/34 |
| | | | | 428/535 |
| 2012/0251818 A1* | 10/2012 | Axrup | ................... | B32B 27/10 |
| | | | | 428/326 |
| 2015/0225590 A1* | 8/2015 | Iotti | ..................... | C08K 5/17 |
| | | | | 428/535 |

FOREIGN PATENT DOCUMENTS

| | | |
|---|---|---|
| EP | 2267222 A1 | 12/2010 |
| EP | 2759577 A1 | 7/2014 |
| FR | 2730251 A1 | 8/1996 |
| JP | S58191296 A | 11/1983 |
| WO | 8503316 A1 | 8/1985 |
| WO | WO8503316 * | 8/1985 |
| WO | 8808899 A1 | 11/1988 |
| WO | WO8808899 * | 11/1988 |
| WO | 2004055267 A1 | 7/2004 |
| WO | WO2004055267 * | 7/2004 |

(Continued)

OTHER PUBLICATIONS

Ankerfors, et al., The use of microfibrillated cellulose in fine paper manufacturing—Results from a pilot scale papermaking trial, Nordic Pulp & Paper Research Journal, vol. 29, No. 3, pp. 476-483, 2014.

(Continued)

*Primary Examiner* — Leszek B Kiliman
(74) *Attorney, Agent, or Firm* — Pearne & Gordon LLP (57) ABSTRACT

The present invention relates to process for the production of a coated substrate comprising cellulosic fibers, the process comprising the steps of:
i) providing a first substrate comprising cellulosic fibers and having a dry content of less than 50%;
ii) applying a coating composition to the first substrate in an amount of more than 5 g/m$^2$, calculated as dry weight of the coating composition, wherein the coating composition comprises:
microfibrillated cellulose (MFC), and
optionally a water retention agent selected from carboxymethyl cellulose (CMC), anionic polyacrylamide (A-PAM), sodium polyacrylates, polyacrylic acid derivatives, guar gum, alginate, MFC prepared from carboxymethylated fibers, MFC prepared from oxidized fibers, MFC prepared by CMC-functionalized fibers, and/or combinations thereof; and
iii) mechanically dewatering the first substrate.

The present process provides an energy efficient coating process which can be performed online.

21 Claims, 2 Drawing Sheets

(56) References Cited

FOREIGN PATENT DOCUMENTS

| WO | 2007088974 | A1 | | 8/2007 |
|---|---|---|---|---|
| WO | 2011005181 | A1 | | 1/2011 |
| WO | 2011040547 | A1 | | 4/2011 |
| WO | 2011056130 | A1 | | 5/2011 |
| WO | 2011056135 | A1 | | 5/2011 |
| WO | WO20110561353- | | * | 5/2011 |
| | 2014 | | | |
| WO | 2011078770 | A1 | | 6/2011 |
| WO | WO2011078770 | | * | 6/2011 |
| WO | 2011147825 | A1 | | 12/2011 |
| WO | 2012066308 | A2 | | 5/2012 |
| WO | 2013027103 | A1 | | 2/2013 |
| WO | 2013188739 | A1 | | 12/2013 |
| WO | 2014044870 | A1 | | 3/2014 |
| WO | WO2014044870 | | * | 3/2014 |
| WO | 2015011337 | A1 | | 1/2015 |
| WO | 2015032432 | A1 | | 3/2015 |

OTHER PUBLICATIONS

Lavoine, et al., Impact of different coating processes of microfibrillated cellulose on the mechanical and barrier properties of paper, J. Mater. Sci., vol. 49, pp. 2879-2893, 2014.

Lavoine, et al., Mechanical and Barrier Properties of Cardboard and 3D Packaging Coated with Microfibrillated Cellulose, Journal of Applied Polymer Science, vol. 131, Issue 8, app. 40106, pp. 1-11, 2014.

Syverud, Strength and barrier properties of MFC films, Cellulose, vol. 16, pp. 75-85, 2009.

International Search Report and Written Opinion issued in corresponding international application No. PCT/IB2015/059579 dated Jan. 27, 2016, pp. 1-18.

Swedish Office Action issued in application No. 1451581-1 dated Jun. 22, 2015, pp. 1-8.

Swedish Office Action issued in application No. 1451581-1 dated Jan. 27, 2017, pp. 1-8.

* cited by examiner

Fig. 3

PROCESS FOR THE PRODUCTION OF A COATED SUBSTANCE COMPRISING CELLULOSIC FIBRES

TECHNICAL FIELD

The present invention relates to a process for the production of a coated substrate comprising cellulosic fibres, to a paper or board produced by the process and to a use of the produced paper or board as a packaging material.

BACKGROUND ART

Packaging materials of paper and board have been used for a long time for packaging of different goods so as to provide mechanical and/or chemical protection for the goods. For example perishable products, such as food products, healthcare products and electronic devices have been packaged in paper or board packages provided with a barrier that provides protection against chemical influence, e.g. against gas, such as oxygen, liquid, aroma, oil and/or grease. Packages function in a two-way manner, which means that liquid from the inside of the package is prevented to leak out and the liquid outside the package is prevented to leak inside the package. The same applies for oxygen, aromas, oil and grease.

It is important that the packaging materials can provide an oxygen barrier especially in case of perishable products that are sensitive to oxygen since bacteria are aerobic and thus need oxygen to grow. Therefore, a barrier against oxygen is needed to provide extended shelf life for the packaged product. Oxygen barriers can be provided for example in the form of various polymer coatings, such as ethylene vinyl alcohol (EVOH), ethylene vinyl acetate (EVA), nylon MXD6, polyvinylidene chloride (PVDC) and liquid-crystal polymers (LCPs) coatings. The coatings may be applied on a substrate for example by means of extrusion coating or as e.g. an aluminium foil. A drawback with extrusion coating is, however, that it is difficult to combine in existing production lines for paper and/or board materials in an efficient way, since in connection with extrusion the substrate needs first to be dried, then coated and then dried again. Such production lines are not energy efficient. Thus, there is a need to be able to combine or integrate a coating process to the existing paper or board production lines in an energy efficient way. Other possibility to provide a barrier is to apply a layer of aluminium foil to the substrate. Aluminium provides an excellent barrier but increases the carbon dioxide load (carbon foot print) of the product and also makes the product difficult to recycle.

In view of the prior art, it is desirable to at least partially replace existing coating processes and coating materials with more energy effective and environmentally friendly processes and coating materials. The packaging material should also be easily recyclable and/or biodegradable to decrease the environmental load and carbon foot print.

WO2011056130 discloses a process for producing a coated substrate comprising cellulosic fibres by applying a dispersion coating composition comprising MFC (microfibrillated cellulose) in an amount of 0.5 to 20 weight-% and colloidal particles of a polymer which can be polyvinylidene chloride (PVDC), polyvinylalcohol (PVOH), ethylene vinyl alcohol (EVOH), acrylate copolymers, modified styrene, butadiene, polyolefins, acrylonitrile, fumaric and maleic diesters, cellulose esters, starch ethers, different acrylates or methacrylates, vinyl acetates, polymers which origins from potato, corn, cereals, wood, xylane or similar products or a composition of any of these polymers on the surface of the substrate. The coating provides a barrier. However, the disclosed composition comprises a major amount of colloidal particles of a polymer, and as mentioned above, it would be desirable to replace at least partially such coating materials. Also, it has been mentioned that the coating can be performed on-line or off-line, but it has not been disclosed how the production can be performed on-line or off-line.

WO2013027103 discloses a process for providing a substrate with a barrier comprising coating the substrate with a coating composition comprising at least one water soluble polymer, such as PVOH, carboxymethyl cellulose (CMC) and/or hemicelluloses, and a nano-particle being a nanoclay, MFC, aluminium silicate, nano precipitated calcium carbonate, nanotalcum, nanotitanium dioxide, xylene, carboxy methyl cellulose and/or silica. The composition is coated on the substrate by means of foam coating, blade coating or by means of a size press. The coated substrate is then dried and an aqueous barrier activating solution is added to the substrate. However, there is no mention that this coating process can be integrated in an easy way to existing production lines for paper and/or board materials. Also, since the coated substrate needs to be activated after drying, an additional drying and activation section in the paper machine is required.

Thus, even though there are prior art solutions for coating processes there is still a need to improve the integration of a coating operation into a paper making process in a simple and energy efficient way. There is also a need to combine or integrate a coating process into existing paper or board production lines. Further, there is a need for an environmentally friendly process to provide a coating functioning as a barrier for a substrate. There is also a need for an environmentally friendly packaging material which is easily recyclable while it comprises a high quality barrier.

SUMMARY OF THE INVENTION

The object of the present invention is to provide a coating process that fulfils the above-identified needs. Thus, it is an object of the present invention to improve the on-line coating processes that provide a barrier and minimize the problems stated above in connection with the prior art solutions. Especially, it is an object of the present invention to provide a process for the production of a coated substrate comprising cellulosic fibres, which process is efficient and can be performed on-line with existing paper or board production processes and provides an environmentally friendly final coated substrate including a barrier.

According to the invention the objects above are attained by a process for the production of a coated substrate comprising cellulosic fibres according to the attached claims. The process comprises the steps of:
i) providing a first substrate comprising cellulosic fibres and having a dry content of less than 50%;
ii) applying a coating composition to the first substrate in an amount of more than 5 g/m², calculated as dry weight of the coating composition, wherein the coating composition comprises:
   microfibrillated cellulose (MFC), and
   optionally a water retention agent selected from carboxymethyl cellulose (CMC), anionic polyacrylamide (A-PAM), sodium polyacrylates, polyacrylic acid derivatives, guar gum, alginate, MFC prepared from carboxymethylated fibers, MFC prepared from oxidized fibers, MFC prepared by CMC-functionalized fibers, and/or combinations thereof; and iii) mechanically dewatering the first substrate.

It has been surprisingly found that the amount of the microfibrillated cellulose, hereinafter referred to as MFC, in the coating can be substantially increased due to the present coating process, in which the MFC is added to a wet surface, i.e. to a surface that has not been dewatered or has been only partially dewatered and has a dry content of less than 50%. The substrate has a low dry content in the wet end of the paper machine after web formation but before press and drying section, and thus application of the coating can be integrated to the existing paper/board machines. This is a huge advantage since there is no need for an extra drying section and the existing pressing and drying sections can be used. Thus, it is possible to simultaneously dewater and dry the substrate and the coating thereof in an integrated process. Also, since MFC in itself is a cost effective and environmentally friendly product and exhibits exceptional oxygen barrier properties outperforming most of the commercial barrier products on the market (Lindstrom, T., Aulin, C., Naderi, A. and Ankerfors, M. 2014. Microfibrillated Cellulose. Encyclopedia of Polymer Science and Technology. 1-34.), a high quality coated substrate and thus packaging product can be provided. Also, MFC is a non-food product whereby problems associated with the use of food-based products in industrial applications can be avoided. However, previously it has been practically difficult to utilize large amounts of MFC in coatings and coating processes mainly due to a low solids content of the MFC and a high viscosity. MFC has a tendency to drain off water quickly which deteriorates the coating hold-out and makes it difficult to obtain a continuous film on a substrate. Also problems in the coating such as pinholes can be created in the film. This makes the film discontinuous and thus not a good barrier. However, by means of the present process, in which an amount of more than 5 $g/m^2$ is applied to the wet substrate having a dry content of less than 50%, problems with coating hold-out and pinholes can be decreased or eliminated. The amount may suitably be more than 10 $g/m^2$. A further advantage with the present invention is that the process can be performed on-line at normal high speeds of a paper/board machine, at wide paper or board machines. Also, major investments are not necessary, i.e. equipment that normally is available can be used. Further, the barrier provided has equal quality compared with prior art coating methods, in which the coating is added to a dry substrate and then dried, which is a further unexpected feature.

The process can further comprise providing a second substrate comprising cellulosic fibres and having a dry content of less than 50% by weight in the above-defined step i). In case a second substrate is provided, the above-defined step iii) further comprises attaching the second substrate to the first coated substrate, such that the coating composition is placed between the first and second substrates, and subsequently mechanically dewatering the attached first and second substrates. In this way a sandwich construction is provided, whereby a barrier function is provided between the first and second substrates. Thus, the coating may be protected towards external influences. Also, during the production, the coating layer containing the MFC can be at least partially encapsulated between the first and second substrates and thus the paper machine can be protected from being contaminated with MFC.

The step ii) defined above may further comprise applying the coating composition in an amount of more than 5 $g/m^2$, calculated as dry weight of the coating composition, to the second substrate. In this way a larger amount of the coating composition can be applied simultaneously to both of the substrates and thus e.g. production speed may be increased.

The coating composition preferably comprises the microfibrillated cellulose in an amount of at least 90% by weight, calculated as dry weight. This provides the coating with good physical, mechanical and barrier properties.

The coating composition preferably comprises the water retention agent in an amount of at least 1% by weight, calculated as dry weight and based on the dry weight of the MFC. The water retention agent decreases the drainage of the MFC and hence the quality of the coating layer can be improved.

In case the coating composition is applied in step ii) in an amount of more than 15 $g/m^2$, calculated as dry weight of the coating composition, the coating composition may comprise the water retention agent in an amount of at least 2% by weight, calculated as dry weight and based on the dry weight of the MFC. In this way the amount of water retention is minimized while a good barrier still can be provided.

In another embodiment in case the coating composition is applied in step ii) in an amount of more than 10 $g/m^2$, calculated as dry weight of the coating composition, the coating composition comprises the water retention agent in an amount of at least 3% by weight, calculated as dry weight and based on the dry weight of the MFC. In this way water retention can be controlled in a very good way while very good barrier properties can be provided.

In a further embodiment, in case the coating composition is applied in step ii) in an amount of more than 20 $g/m^2$, calculated as dry weight of the coating composition, the coating composition comprises the water retention agent in an amount of at least 1% by weight, calculated as dry weight and based on the dry weight of the MFC.

In a still further embodiment the coating composition is added in an amount of more than 25 $g/m^2$, calculated as dry weight of the coating composition, and the coating composition comprises no water retention agent. By applying this relatively large amount of MFC, a barrier may be provided while retention characteristics are suitable for on-line production.

The coating composition comprises the water retention agent preferably in an amount of up to about 10% by weight, calculated as dry weight and based on the dry weight of the MFC. In this way it is possible to avoid dewatering problems caused by insufficient dewatering in the press section of the paper machine.

According to another aspect, the coating composition comprises the water retention agent in an amount of up to about 8.5% by weight, calculated as dry weight and based on the dry weight of the MFC. In this way an excellent barrier may be provided while dewatering problems can be avoided.

Suitably, the coating composition is applied in step ii) to the first surface and/or second surface in a total amount of up to and including about 50 $g/m^2$. In this way a barrier can be provided while the process still can be well controlled. Preferably, the coating composition is applied in step ii) to the first surface and/or second surface in a total amount of about 10-40 $g/m^2$ or more preferably about 10-35 $g/m^2$, whereby very good barrier can be provided in an energy efficient process.

The first and/or second substrates can have a dry content of less than 30-40% by weight or as low as less than 10-30% by weight. This makes it possible to apply the coating composition to the web in close proximity of the forming wire, which further simplifies the machine construction suitable for the present process.

The water retention agent is preferably CMC. CMC is a high performance water retention agent, which provides a high quality barrier even if added in small amounts while problems with dewatering in the press section can be avoided.

The coating composition may be applied to the surface by means of many different coating technologies, such as by spray coating, roller coating, slot coating, immersion coating, gravure coating, reverse direct gravure coating, extrusion coating, curtain coating, rod coating, and/or gap coating or combinations thereof. However, the coating composition is preferably added by means of spray coating, whereby an accurate application at high production speeds is enabled.

The step of mechanical dewatering comprises preferably pressing, and is performed suitably in the press section of a paper machine. After mechanical dewatering in the step iii) the process further comprises a step of drying the substrate/substrates, preferably in the drying section of the paper machine.

The present invention also relates to a paper or board produced by the process according to the above-described process. The paper or board product comprises a first substrate upon which a coating composition has been applied, wherein the first substrate comprises cellulosic fibres, and wherein the coating composition comprises microfibrillated cellulose (MFC), and, optionally, a water retention agent selected from carboxymethyl cellulose (CMC), anionic polyacrylamide (A-PAM), sodium polyacrylates, polyacrylic acid derivatives, guar gum, alginate, MFC prepared from carboxymethylated fibers, MFC prepared from oxidized fibers, MFC prepared by CMC-functionalized fibers, and/or combinations thereof. The coating composition has been applied in an amount of more than 5 g/m2.

Since the substrate is wet during the coating, and pressed and dried together with the substrate, the coating composition is attached and nearly integrated to the substrate in an efficient way. Thus, a smooth and evenly distributed coating layer with secure attachment to the substrate can be provided. The coating provides a barrier against oxygen and other gases, aroma, oil, grease and organic solvents. The paper or board can be used as a packaging material, for example for perishable goods and/or healthcare products. In addition, the coating provides improved delamination strength/resistance of the product, i.e. z-strength.

Further features, objects and advantages with the present invention are defined in the following detailed description of the invention.

DETAILED DESCRIPTION

The present invention relates to a process for the production of a coated substrate comprising cellulosic fibres. The process can be performed in an energy efficient and environmentally friendly way. The process is performed in a paper or board making machine in which paper or board is manufactured in a continuous web. The definitions of paper machine and board machine are in this context used equally.

By "substrate comprising cellulosic fibres" is meant a base web or sheet comprising fibres from unbleached or bleached pulp which can be chemical pulp such as sulfate, kraft, soda, or sulfite pulp, mechanical pulp, thermomechanical pulp or chemi-thermomechanical pulp and the raw material can be based on softwood, hardwood, recycled fibres or non-wood suitable for making paper or paperboard/cardboard.

By "dry content" is meant content of dry matter in a slurry or solution. That is, for example 50% dry content means that the weight of the dry matter is 50%, based on the total weight of the solution or slurry. Analogously, by "dry weight" is meant the weight of dry matter.

By definition "more than" is meant more than, but not including the numerical value in question. Analogously with "less than" is meant less than, but not including the numerical value in question. E.g. by more than 5 g/m$^2$ is meant amount more than, but not including 5 g/m$^2$.

By "microfibrillated cellulose" (MFC) is meant a material typically made from wood cellulose fibres, both from hardwood or softwood fibres. It can also be made from microbial sources, agricultural fibres such as wheat straw pulp, bamboo or other non-wood fibre sources. MFC is prepared from untreated or enzymatically treated pulps followed by mechanically delamination of the fibers. In microfibrillated cellulose the individual microfibrils have been partly or totally detached from each other. A microfibrillated cellulose fibre is normally very thin (about 20 nm) and the length is often between 100 nm to 10 μm. However, the microfibrils may also be longer, for example between 10-200 μm. Fibres that have been fibrillated and which have microfibrils on the surface and microfibrils that are separated and located in a water phase of a slurry are included in the definition MFC. Microfibrillated cellulose (MFC) mentioned as a nanoparticle is also known as nanocellulose, nanofibrillated cellulose or cellulose nanofibrils (CNF). By all these definitions are in this context equally meant microfibrillated cellulose, MFC.

By "water retention agent" is meant an agent or additive suitable for improving the retention of a component or components included in a MFC suspension, pulp suspension, paper web or board web during some process stage/stages, e.g. during drainage.

By "mechanical dewatering" is meant dewatering performed by means of mechanical forces, e.g. by means of pressing.

By "composition" is meant a ready to use composition or composition that is formed on the substrate after application, i.e. the components of the composition may be added simultaneously in a ready to use composition or simultaneously or nearly simultaneously, but separately, whereby the components form a composition on the substrate.

As described herein below, it is possible to produce a coated substrate containing cellulosic fibres with a coating composition comprising MFC and optionally a water retention agent at the wet end of a paper or board making machine and thus provide a barrier or a film with barrier properties on a substrate. By wet substrate is meant a substrate comprising cellulosic fibres and having a dry content of less than 50%. The dry content may be lower, such as 30-40% or even as low as 10-30%.

The coating composition is applied in an amount of more than 5 g/m$^2$, calculated as dry weight of the coating composition. The coating composition comprises microfibrillated cellulose (MFC), and optionally a water retention agent selected from carboxymethyl cellulose (CMC), anionic polyacrylamide (A-PAM), sodium polyacrylates, polyacrylic acid derivatives, guar gum, alginate, MFC prepared from carboxymethylated fibers, MFC prepared from oxidized fibers, MFC prepared by CMC-functionalised fibers, and/or combinations thereof. The MFC can be provided as a dispersion having a MFC-concentration of about 1-5% by weight, such as about 2% by weight of the dispersion. The MFC improves physical and mechanical properties of the coating compared to traditional polymer coatings. Also, it is possible to obtain improved Oxygen Transmission Rate (OTR) properties with the present coating.

The coating composition is preferably aqueous, meaning that water is present in the coating composition comprising the MFC and the optional water retention agent. The water content may vary widely and is adjusted to the production conditions and application method. The skilled person is able to adjust the water content in accordance with process conditions and the water content may vary for example within the range coating composition to water 0.1:100 to 25:100, but is not limited to these contents.

The coating composition is applied in a sufficient quantity in order to, after drying, form a continuous coating layer throughout the entire width of the substrate. The coating layer forming the barrier is sufficiently thick to provide an efficient oxygen/gas/oil/grease/organic solvent barrier. It should also be ensured that the coating can be applied on wet substrates and cover the whole surface of the wet substrate. It has been shown that with the coating composition in the claimed amount of the present invention a good barrier can be produced.

In the present process the coating can be applied in a total amount of more than 5 g/m$^2$ (dry weight), such as more than 10 g/m$^2$ (dry), and even more than and including 15 g/m$^2$ (dry).

The coating may be applied to at least a first substrate provided in the process. This means that in case there are several webs of substrates in the process, at least one of the substrates is coated. It is also possible to apply coating to several and/or all substrates in the process, such as to two substrates. The total coating amount mentioned above is the total coating amount applied to all substrates together. The upper limit is defined by practical aspects and can be e.g. up to 50 g/m$^2$. Preferably, the total amount of the coating is kept under about 40 g/m$^2$. The more coating composition comprising MFC is applied to the substrate, the less is the amount of water retention agent required in the composition. When the coating composition is applied in amounts of more than 5 g/m$^2$ but less than about 40 g/m$^2$ it has surprisingly been noted that the water retention agent even further improves the barrier properties obtained.

The water retention agent is present in the coating composition in such amounts that the substrate can be dewatered mechanically in the press section of the paper machine. Thus, preferably the amount of the water retention agent is less than about 20% by weight (dry), based on the dry weight of the MFC. The combination of the features to coat with the specific amount of more than 5 g/m$^2$ and to apply of the coating in the wet end of the paper machine provides the unexpectedly good barrier properties more environmentally friendly than known processes. A huge advantage with the present invention is that the process can be performed on-line at normal high speeds of a paper machine, at wide paper or board machines. Also, major investments are not necessary, i.e. equipment that normally is available can be used. Further, the barrier provided has equal quality compared with prior art coating methods, in which the coating is added to a dry substrate and then dried. This is unexpected.

The coating weights of the present invention are generally somewhat higher than coating weights described in the prior art described in the background above, in which as low coating weights as possible have been desirable. However, the MFC-containing coating of the present invention does not increase the total costs of the produced material significantly, since remarkable energy savings can be obtained when the coating can be applied on a wet substrate and existing production lines be used. Also, a robust coated substrate, which is easily recyclable can be obtained. For example, due to the higher amount of coating than in the prior art solutions the microroughness, pinholes and/or interconnected pores in the applied coating can be avoided more easily due to larger coating weights. Also small defects or variations in the coating layer do not have severe effects on the behavior of the barrier layer.

The water retention agent is suitably selected from carboxymethyl cellulose (CMC), anionic polyacrylamide (A-PAM), sodium polyacrylates, polyacrylic acid derivatives, guar gum, alginate, MFC prepared from carboxymethylated fibers, MFC prepared from oxidized fibers, MFC prepared by CMC-functionalised fibers, and/or combinations thereof. It has been shown that CMC is especially suitable as a water retention agent in the coating composition for the formation of barrier according to the present process. The water retention agent functions as an additive or thickening agent and is present in an amount of less than 20% by weight (dry), based on the dry weight of the MFC, and preferably in an amount of less than and including 10% by weight (dry), based on the dry weight of the MFC. In other words, the weight ratio of the water retention agent and the MFC of the coating composition can be less than 20:100 and preferably less than and including 10:100 (water retention agent:MFC). If the amount of the water retention agent is kept at these low levels the water retention agent has the ability to retain water without preventing dewatering of the substrate/substrates in the press section of the paper machine. The water retention agents also contribute to form good barrier films. The ratio between the water retention agent and the MFC of the coating composition is preferably between 1:100-1:10 (water retention agent:MFC). Very good results have been obtained when the ratio is between 3:100-8.5:100, corresponding to a water retention agent amount of 3-8.5% by weight, based on the weight of MFC, and when the total amount of the coating composition is over 10 g/m$^2$, not including 10 g/m$^2$, and less than 40 g/m$^2$.

The coating composition can be applied to a substrate by means of any suitable coating means, such as by means of spray coating, roller coating, slot coating, immersion coating, gravure coating, reverse direct gravure coating, extrusion coating, curtain coating, rod coating, and/or gap coating or combinations thereof. The coating is applied preferably by spray coating, which is a simple, effective and accurate method for applying the coating composition in high production speeds in on-line production modes. The substrate of the present invention is a substrate comprising cellulosic fibres having a dry content of less than 50%. The coating may be arranged in between two substrates and thus form a sandwich construction. This can be achieved by arranging two webs, each from a former, to be attached together and before the attachment apply the coating composition on or to at least one of the substrates. Sandwich construction is especially preferable embodiment of the present invention, since it is easier to manufacture due to the fact that the coating composition is at least partially encapsulated in between two substrates, whereby contamination caused by MFC can be decreased.

Figure 1:
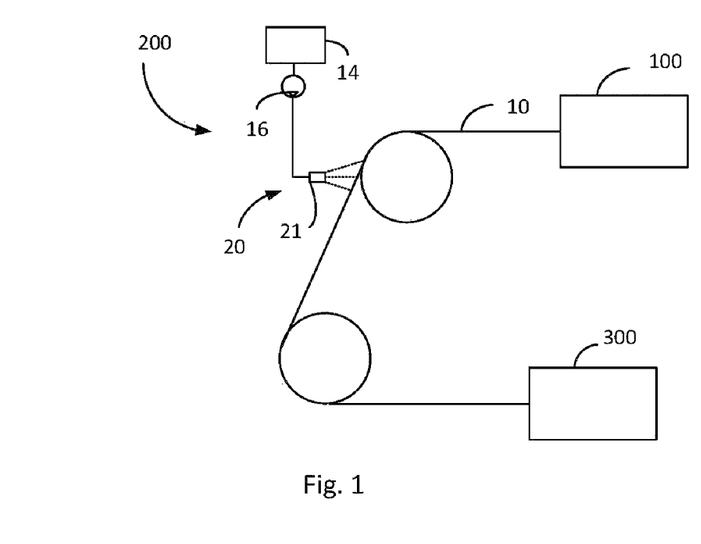
FIG. 1 Schematically illustrates coating of one substrate in an on-line process.

FIG. 1 schematically illustrates coating of one substrate in an on-line process. A wet first substrate 10 is formed at a forming section 100 of a paper/board machine and the formed web 10 is submitted further towards pressing section 300 of the paper or board machine through coating application section 200. The coating application section 200 comprises a container 14 that contains an aqueous coating composition, which is pumped by means of a pump 16, which can be driven mechanically or electrically, to a spraying device 20 comprising at least one spraying nozzle arrangement 21. The spraying nozzle arrangement 21 is arranged to spray the coating composition at a spraying rate that provides a smooth coating at an amount of more than 5 g/m$^2$, based on the dry weight of the coating, to the substrate 10. After coating, the web 10 is submitted to the press section of the paper machine and dewatered mechanically before drying in the drying section of the paper machine.

Figure 2:
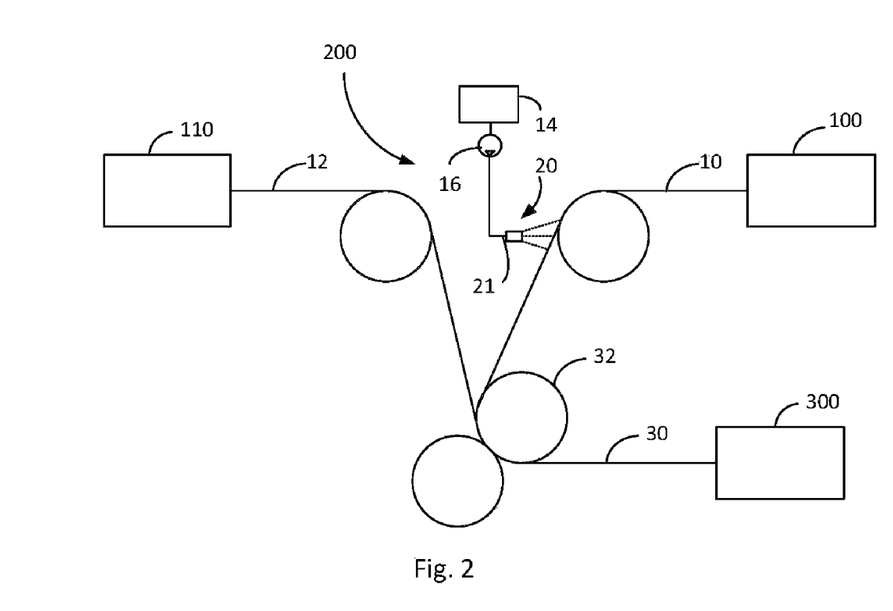
FIG. 2 Schematically illustrates coating of one substrate in an on-line process and attachment of two substrates together.

In FIG. 2 another embodiment of the present invention is illustrated. The process is identical with the process in FIG. 1 except that a second wet substrate 12 in form of a wet web is submitted from a second forming section 110 to the coating application section 200. However, only the first wet substrate 10 is coated by means of the spraying device 20 with a nozzle arrangement 21 before attaching the first and second substrates together at an attachment cylinder 32. The coating composition is sprayed on the first substrate 10 and the coating composition is placed between the first and second substrates 10, 12. The formed web 30 has thus a sandwich construction and is subsequently mechanically dewatered at the pressing section 300 of the paper machine.

Figure 3:
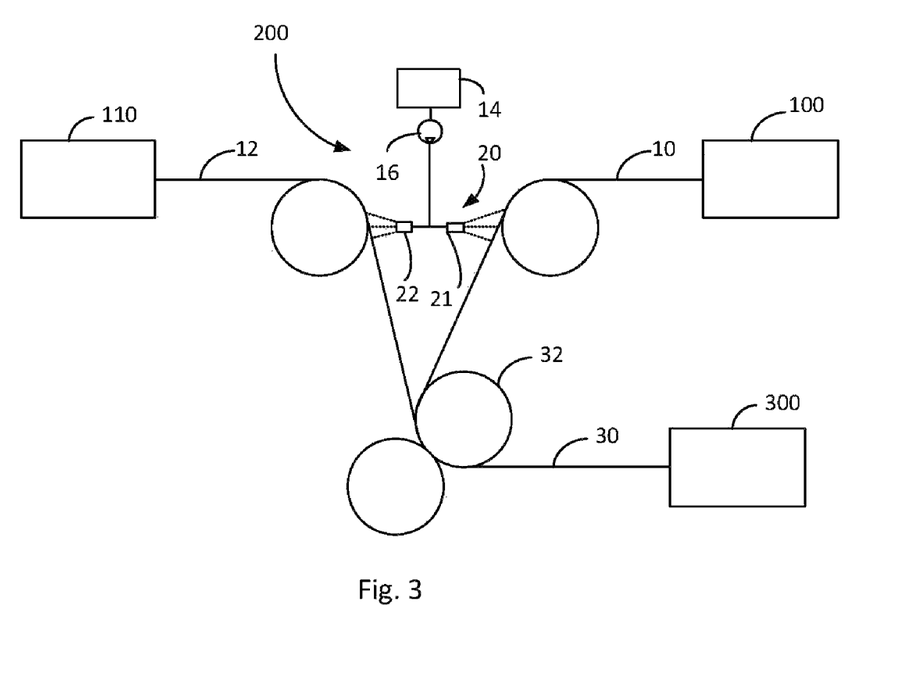
FIG. 3 Schematically illustrates coating of two substrates in an on-line process and attachment of the two substrates together.

FIG. 3 illustrates a further embodiment of the present invention. The process is identical with the processes in FIGS. 1 and 2 except that a second wet substrate 12 in form of a wet web is submitted from a second forming section 110 to the coating application section 200. Both the first wet substrate 10 and the second wet substrate 12 are coated by means of the spraying device 20 with nozzle arrangements 21 and 22 before attaching the first and second substrates together at an attachment cylinder 32. The coating composition is sprayed on the first substrate 10 and the second substrate 12 and the coating composition is placed between the first and second substrates 10, 12. The formed web 30 has thus a sandwich construction and is subsequently mechanically dewatered at the pressing section 300 of the paper machine.

It is preferred to add the coating composition to the substrate in one single step. It is thus not necessary to provide the surface of the substrate with more than one coating layer. The barrier is preferably a barrier against oxygen, gases, aromas, grease and/or oil, organic solvents. It is possible to combine the barrier according to the invention with other barrier layers, such as a barrier layer against a liquid such as water, water vapor and alcohols. This is especially suitable if the substrate is used as a liquid packaging board. It is then preferred to provide the board substrate with a coating layer according to the invention and thereafter, suitably in a separate process, add a layer with barrier properties against liquids, such as a PE or a PET layer, on top of the barrier according to the invention. In this way the board will have both oxygen and liquid barrier properties. It is also possible to combine the barrier according to the invention with another barrier structure based on bio-based barrier such as PLA, PGA, bio-PE, starch, protein or polysaccharide based barriers. In this way a furthermore improved barrier product can be produced.

After the coating composition is applied to the substrate or substrates, a mechanical dewatering of the substrate/substrates is performed. Preferably, the mechanical dewatering is performed by means of existing pressing devices in the press section of the paper or board making machine. Alternatively, an additional pressing device, such as pressing cylinder or cylinders, may be added prior to entering the existing press section of the paper machine. In order for a barrier to form on the substrate, it is important that the substrate is smooth and that no holes appear in the coating. In order for a good barrier to form by coating it is also important that the coating is evenly distributed, i.e. that there are no or substantially no caliper or grammage variations of the coating layer. When the coating layer is applied on the wet surface, the coating layer forms a barrier that also stays on the surface of the substrate to which it is coated. Furthermore, the barrier layer possesses good adhesive properties to the substrate to which it is coated. The barrier coating also possesses good mechanical properties making it possible to convert the substrate to which it is added without breaking the barrier layers during converting or other mechanical handling. After dewatering, the coated substrate is dried in the drying section of the paper machine.

The present invention also relates to a paper or board product produced according to the process. It is possible to use the board product with the barrier according to this invention together with a layer with liquid barrier properties is used as a liquid packaging board. The paper or board product produced may also be used as a packaging material for perishable goods, such as food packages, e.g. frozen food materials or dry food materials and/or for healthcare products. The paper or board product produced according to the process is provided with a very effective barrier.

In view of the above detailed description of the present invention, other modifications and variations will become apparent to those skilled in the art. However, it should be apparent that such other modifications and variations may be effected without departing from the spirit and scope of the invention defined in the appended claims.

EXAMPLES

Example 1

This example shows how the used coating formulation was manufactured. The microfibrillated cellulose (MFC) was manufactured at a pilot plant at Innventia. A never-dried bleached sulphite softwood pulp (Nymolla Mill, Stora Enso, Sweden) was used for the MFC preparation. The pulp was first pre-treated using a three step treatment including refining—enzyme—refining procedures. A conventional pulp refiner was used for the refining steps. The pulp was first refined to about 30-40° SR. Then the enzymatic treatment was carried out with 0.17 µl monocomponent endoglucanase per gram fibre (5 ECU/µl) at 50° C. for 2 hours followed by a second refining to about 80-90° SR. The pulp slurry of about 2.5 wt. % was homogenized through a high-pressure homogenizer (NS3024H, GEA Niro Soavi, Italy). The operating pressure and the slit size of the homogenizer were 1400-1600 bar and 100-200 µm, respectively.

A water retention agent selected from the following; CMC, A-PAM, alginate, guar gum or oxidized MFC (carboxymethylated or CMC-functionalized), was added to a 2.9 wt. % MFC dispersion in order to form a coating formulation. The water retention agent constituted between 0-10 wt.

% based on the dry weight of MFC. The coating formulation was stirred for 24 h followed by high-pressure homogenization at 500 bars to ensure full mixing. The concentration of coating formulation was ca. 2.7-2.9%.

Preparation of Laboratory Sheets

Uncoated laboratory paper substrates, with a grammage of 60 g/m², were used as base substrates for the coating process. These base papers were prepared with the aid of a Finnish sheet former according to ISO 5269-1. The sheets were made from bleached kraft pulp (Sodra Blue Z). The bleached kraft pulp was refined to 25° SRThe sheets were either prepared wet without pressing (dry content less than 22%) or pressed twice at 400 kPa for 5 min and 2 min, respectively, to a dryness of 50%. Dry sheets were also prepared using the same pressing procedure followed by drying at 23° C. and 50% RH (dryness >90%).

Measuring Dewatering of Coating Formulations

The amount of transferred water (g/m²) from the coating formulations was measured using a gravimetric method developed by Abo-Akademi. A standardized condition according to Tappi T-701 was used. The method describes a procedure to characterize the water retention properties of the coating formulation under static conditions.

Example 2

This example shows that it is possible to significantly decrease the amount of transferred water from the coating formulation by adding a water retention agent. Table 1 shows the amount of transferred water of pure MFC dispersion and coating formulations where a water retention agent, of 10 wt. % based on the dry weight of MFC, has been added. The water holding capacity is significantly increased, that is, the amount of transferred water is decreased, by adding the water retention agents.

TABLE 1

Transferred water (g/m²) of pure MFC dispersion and coating formulations consisting of MFC and a water retention agent of 10 wt. % based on the dry weight of MFC.

| Water retention agent: | Water retention agent content (%): | Transferred water (g/m²): |
|---|---|---|
| CMC | 10 | 612 |
| Alginate | 10 | 7922 |
| A-PAM | 10 | 2142 |
| Guar gum | 10 | 3178 |
| Carboxymethylated MFC | 10 | 6360 |
| MFC | 0 | 9050 |

Example 3

This example shows how the wet, pressed or dried sheets were spray-coated with a formulation consisting of Microfibrillated cellulose (MFC) or MFC in combination with CMC. The thickener constitutes 0-10 wt. %, based on the dry weight of MFC.

A commercial paint sprayer (Graco Easy Max WP 2, US) was used to apply the coating formulation on the sheets or as a middle layer between the sheets. The wet, pressed or dry sheets were placed on a conveyor. A spray gun was mounted horizontally with respect to the sheets. The coat weight was adjusted by changing the speed of the conveyor.

Sheets were one-side coated once, or twice by reversing the conveyor belt. The sheets were thereafter dried at 23° C. and 50% RH. In order to apply the coating formulation as a middle layer, sheets were coated separately, couched, and thereafter pressed and dried according to ISO 5269-1. A total coat weight of 4.5 to 34.6 g/m² was applied.

Results

Oxygen transmission rate (OTR) tests were performed with a Mocon Ox-Tran Model 2/21 apparatus (Mocon, Minn., USA) in accordance with ASTM D 3985-06 and the test conditions were 23° C. at 50% RH. The sample area was 5 cm² and the partial pressure of the oxygen was 1 atm. OTR value over 3000 is shown as "fail" in the Tables 2 and 3 below. OTR-values of below 10 are considered as excellent.

The oil/grease resistance was measured in accordance with Tappi T-454, where the penetration time for red-dyed turpentine oil through the coated sheet was recorded. The test terminates after 30 minutes.

TABLE 2

Oxygen transmission rate (OTR) (ml/m² 24 h atm) and oil resistance (min) of one-side coated sheets at 23° C. and 50% RH.

| CMC content (%) | Coat weight (g/m²) | Oxygen transmission rate (ml/m² 24 h atm) | | Oil resistance according to Tappi 454 (min)2 | |
|---|---|---|---|---|---|
| | | 50% sheet dryness | Dry sheets | 50% sheet dryness | Dry sheets |
| 8.5 | 4.5 | fail | fail | 3 | 1 |
| 8.5 | 17 | 5.5 | 94 | >30 | >30 |
| 8.5 | 2 × 8.8 | 3.5 | 2.3 | >30 | >30 |
| 8.5 | 2 × 17 | 1.9 | 2.4 | >30 | >30 |
| 4.25 | 16.5 | 3.7 | 2.8 | >30 | >30 |
| 4.25 | 2 × 5.6 | 953 | fail | >30 | >30 |
| 4.25 | 2 × 8.7 | 6 | 4.2 | >30 | >30 |
| 3 | 13.1 | 1688 | | >30 | |
| 3 | 16.5 | 7.1 | | >30 | |
| 2 | 15.8 | 863 | | >30 | |
| 2 | 11.0 | fail | | 8 | |
| 0 | 16.4 | fail | fail | 7 | 7 |
| 0 | 2 × 8.5 | fail | fail | 13 | 3 |

TABLE 3

Oxygen transmission rate (OTR) (ml/m² 24 h atm) and oil resistance (min) at 23° C. and 50% RH for the sheets where the coating formulation was applied as a middle layer.

| CMC content (%) | Coat weight (g/m²) | Oxygen transmission rate (ml/m² 24 h atm) | | | Oil resistance according to Tappi 454 (min) |
|---|---|---|---|---|---|
| | | wet sheets | 50% sheet dryness | Dry sheets | |
| 8.5 | 16.7 | | 2.6 | | |
| 8.5 | 17.7 | | | 2.6 | |
| 8.5 | 13.9 | 1.6 | | | |
| 8.5 | 2 × 7.1 | 3.0 | | | |
| 8.5 | 2 × 8.3 | | 4.9 | | |
| 8.5 | 2 × 9.0 | | | 4.1 | >30 |
| 8.5 | 2 × 4.9 | 614 | | | |
| 8.5 | 7.3 | fail | | | 4 |
| 8.5 | 2 × 5.9 | | 4.7 | | >30 |
| 8.5 | 8.3 | | fail | | 6 |
| 8.5 | 9.0 | | | 1292 | 5 |
| 5 | 2 × 7.5 | 6.4 | | | >30 |
| 5 | 14.8 | 7.7 | | | 26 |
| 0 | 2 × 17.3 | | 351 | | >30 |

It can be seen from Table 2 that a coat weight of >10 g/m² and a CMC content of 3-8.5 wt. % with respect to MFC renders excellent oxygen (OTR<10 ml/m² 24 h atm) and oil/grease (>30 min) barrier properties. The dryness of the sheets and the number of coating steps do not influence the OTR and oil resistance properties of the coated product. It can be seen from Table 3 that a coat weight of >10 g/m² and a CMC content of 3-8.5 wt. % with respect to MFC renders excellent oxygen (OTR<10 ml/m² 24 h atm) and oil/grease (>30 min) barrier properties. The dryness of the sheets and the number of the coating steps do not influence the OTR and oil resistance properties of the coated product.

Thus it is possible to obtain an excellent barrier even when the coating is performed in the wet end of the paper making process.

The invention claimed is:

1. A process for the production of a coated substrate comprising cellulosic fibres, the process comprising the steps of:
    i) providing a first substrate comprising cellulosic fibres and having a dry content of less than 50% by weight;
    ii) applying a coating composition to the first substrate in an amount of more than 5 g/m², calculated as dry weight of the coating composition, wherein the coating composition comprises:
        microfibrillated cellulose (MFC), and
        a water retention agent selected from carboxymethyl cellulose (CMC), anionic polyacrylamide (A-PAM), sodium polyacrylates, polyacrylic acid derivatives, guar gum, alginate, MFC prepared from carboxymethylated fibers, MFC prepared from oxidized fibers, MFC prepared by CMC-functionalized fibers, and/or combinations thereof; and
    iii) mechanically dewatering the first substrate,
    wherein the coating composition comprises the water retention agent in an amount of at least 1% by weight, calculated as dry weight and based on the dry weight of the MFC.

2. The process according to claim 1, wherein the process further comprises in step i) providing a second substrate comprising cellulosic fibres and having a dry content of less than 50% by weight, and in step iii) attaching the second substrate to the first substrate, such that the coating composition is placed between the first and second substrates, and subsequently mechanically dewatering the attached first and second substrates.

3. The process according to claim 2, wherein the step (ii) further comprises applying the coating composition in an amount of more than 5 g/m², calculated as dry weight of the coating composition, to the second substrate.

4. The process according to claim 1, wherein the coating composition comprises the microfibrillated cellulose in an amount of at least 90% by weight, calculated as dry weight.

5. The process according to claim 1, wherein in case the coating composition is applied in step ii) in an amount of more than 15 g/m², calculated as dry weight of the coating composition, the coating composition comprises the water retention agent in an amount of at least 2% by weight, calculated as dry weight and based on the dry weight of the MFC.

6. The process according to claim 1, wherein in case the coating composition is applied in step ii) in an amount of more than 10 g/m², calculated as dry weight of the coating composition, the coating composition comprises the water retention agent in an amount of at least 3% by weight, calculated as dry weight and based on the dry weight of the MFC.

7. The process according to claim 1, wherein the coating composition comprises the water retention agent in an amount of up to about 10% by weight, calculated as dry weight and based on the dry weight of the MFC.

8. The process according to claim 7, wherein the coating composition comprises the water retention agent in an amount of up to about 8.5% by weight, calculated as dry weight and based on the dry weight of the MFC.

9. The process according to claim 1, wherein the coating composition is applied in step ii) to the first substrate and optionally a second substrate in a total amount of up to and including about 50 g/m².

10. The process according to claim 9, wherein the coating composition is applied in step ii) to the first substrate and optionally the second substrate in a total amount of about 10-40 g/m².

11. The process according to claim 2, wherein the first and/or second substrates have a dry content of less than 30-40% by weight.

12. The process according to claim 2, wherein the first and/or second substrates have a dry content of less than 10-30% by weight.

13. The process according to claim 1, wherein the water retention agent is CMC.

14. The process according to claim 1, wherein the coating composition is applied by means of spray coating, roller coating, slot coating, immersion coating, gravure coating and/or reverse direct gravure coating, extrusion coating, curtain coating, rod coating, and/or gap coating or combinations thereof.

15. The process according to claim 14, wherein the coating composition is added by means of spray coating.

16. The process according to claim 1, wherein the step of mechanical dewatering comprises pressing.

17. The process according to claim 1, wherein after the step iii) the process further comprises a step of:
    iv) drying the substrate.

18. A paper or board produced by the process according to claim 1.

19. The paper or board according to claim 18, wherein the coating provides a barrier against oxygen and other gases, aroma, oil, grease and organic solvents.

20. A paper or board product comprising a first substrate upon which a coating composition has been applied, wherein the first substrate comprises cellulosic fibres, and wherein the coating composition comprises:
    microfibrillated cellulose (MFC), and
    a water retention agent selected from carboxymethyl cellulose (CMC), anionic polyacrylamide (A-PAM), sodium polyacrylates, polyacrylic acid derivatives, guar gum, alginate, MFC prepared from carboxymethylated fibers, MFC prepared from oxidized fibers, MFC prepared by CMC-functionalized fibers, and/or combinations thereof;
    characterised by that the coating composition has been applied in an amount of more than 5 g/m²,
    wherein the coating composition comprises the water retention agent in an amount of at least 1% by weight, calculated as dry weight and based on the dry weight of the MFC.

21. A method of use of the paper or board according to claim 18 as a packaging material for perishable goods and/or healthcare products, the method comprising packaging the perishable goods and/or healthcare products in the paper or board.

* * * * *

UNITED STATES PATENT AND TRADEMARK OFFICE
CERTIFICATE OF CORRECTION

PATENT NO. : 10,138,599 B2
APPLICATION NO. : 15/535456
DATED : November 27, 2018
INVENTOR(S) : Christian Aulin et al.

It is certified that error appears in the above-identified patent and that said Letters Patent is hereby corrected as shown below:

On the Title Page

Item (54), the Title "PROCESS FOR THE PRODUCTION OF A COATED SUBSTANCE COMPRISING CELLULOSIC FIBRES" should read --PROCESS FOR THE PRODUCTION OF A COATED SUBSTRATE COMPRISING CELLULOSIC FIBRES--

In the Specification

Column 1, Lines 1-3, the Title "PROCESS FOR THE PRODUCTION OF A COATED SUBSTANCE COMPRISING CELLULOSIC FIBRES" should read --PROCESS FOR THE PRODUCTION OF A COATED SUBSTRATE COMPRISING CELLULOSIC FIBRES--

Column 12, Table 2, Column heading "Oil resistance according to Tappi 454 (min)2" should read --Oil resistance according to Tappi 454 (min)--

Signed and Sealed this
Twelfth Day of March, 2019

Andrei Iancu
*Director of the United States Patent and Trademark Office*